(12) United States Patent
Luo et al.

(10) Patent No.: US 7,613,372 B2
(45) Date of Patent: Nov. 3, 2009

(54) LOW COUPLING LOSS PHOTODETECTOR/OPTICAL FIBER APPARATUS AND METHOD FOR FORMING THE SAME

(75) Inventors: Xin Simon Luo, Monterey Park, CA (US); Pei Chuang Chen, La Canada Flintridge, CA (US); Leming Wang, Arcadia, CA (US); Zhijie Wang, Arcadia, CA (US)

(73) Assignee: AGX Technologies, Inc., Monrovia, CA (US)

( * ) Notice: Subject to any disclaimer, the term of this patent is extended or adjusted under 35 U.S.C. 154(b) by 0 days.

(21) Appl. No.: 11/870,404

(22) Filed: Oct. 10, 2007

(65) Prior Publication Data
US 2008/0095497 A1 Apr. 24, 2008

Related U.S. Application Data

(60) Provisional application No. 60/862,369, filed on Oct. 20, 2006.

(51) Int. Cl.
*G02B 6/32* (2006.01)

(52) U.S. Cl. .............................. 385/33; 365/15; 365/31
(58) Field of Classification Search ................... 385/15, 385/31, 33
See application file for complete search history.

(56) References Cited

U.S. PATENT DOCUMENTS

| | | | |
|---|---|---|---|
| 5,991,019 A | 11/1999 | Sander et al. | |
| 6,113,993 A | 9/2000 | Gao et al. | |
| 6,645,848 B2 | 11/2003 | Joseph et al. | |
| 6,677,172 B1 | 1/2004 | Hou et al. | |
| 6,892,010 B2 * | 5/2005 | Miao et al. | 385/49 |
| 6,936,483 B2 | 8/2005 | Hou et al. | |
| 7,011,455 B2 * | 3/2006 | Luo et al. | 385/88 |
| 7,057,158 B2 | 6/2006 | Luo | |
| 7,061,905 B2 | 6/2006 | Higinbotham et al. | |
| 7,113,672 B2 * | 9/2006 | Wang | 385/34 |
| 7,136,552 B2 | 11/2006 | Luo et al. | |
| 7,173,763 B2 | 2/2007 | Du et al. | |
| 7,220,064 B2 * | 5/2007 | Mori et al. | 385/88 |
| 7,359,701 B2 | 4/2008 | Zhao et al. | |
| 2002/0060843 A1 | 5/2002 | Huang et al. | |
| 2003/0010904 A1 | 1/2003 | Luo | |
| 2003/0010905 A1 | 1/2003 | Luo | |
| 2003/0081634 A1 | 5/2003 | Higinbotham et al. | |
| 2004/0005115 A1 | 1/2004 | Luo et al. | |
| 2004/0179185 A1 | 9/2004 | Wei et al. | |
| 2004/0258368 A1 | 12/2004 | Luo et al. | |
| 2004/0258369 A1 | 12/2004 | Luo et al. | |
| 2005/0019037 A1 | 1/2005 | Luo et al. | |
| 2005/0053334 A1 | 3/2005 | Miao et al. | |
| 2007/0139755 A1 | 6/2007 | Arnone et al. | |
| 2007/0263271 A1 | 11/2007 | Luo | |

\* cited by examiner

*Primary Examiner*—Jennifer Doan
(74) *Attorney, Agent, or Firm*—Aaron Wininger; Nixon Peabody LLP

(57) ABSTRACT

A coupling apparatus includes a lens disposed between a port, such as a photodetector, and a light source, such as a fiber. The lens is aligned such that light emitted from the light source is focused by the lens onto the port. Between the lens and light source and/or lens and port, a low contrast medium is disposed to reduce reflection that could degrade signal strength.

26 Claims, 3 Drawing Sheets

LOW COUPLING LOSS PHOTODETECTOR/OPTICAL FIBER APPARATUS AND METHOD FOR FORMING THE SAME

PRIORITY REFERENCE TO PRIOR APPLICATIONS

This application claims benefit of and incorporates by reference U.S. patent application Ser. No. 60/862,369, entitled "Low Coupling Loss Photodetector/Optical Fiber Apparatus and Method For Forming The Same," filed on Oct. 20, 2006, by inventors Xin Luo et al.

TECHNICAL FIELD

This invention relates generally to laser and optical coupling and more particularly provides an apparatus and method for coupling a light source (e.g. laser) to a receiving device (e.g., port, fiber optic cable).

BACKGROUND

Whenever light travels from one medium into another with a different index of refraction, reflection occurs. The amount of reflection depends on the index difference, or contrast. In applications where light travels from one high index medium, such as glass, into air, which has a low index, and into another high index medium again, significant reflections can occur. Both anti-reflection films or index matching techniques have been used to suppress reflections arising from index contrast.

In fiberoptic communications systems, optical subassemblies are used as light sources, receivers or processing devices. A receiver optical subassembly is exemplified by an optical waveguide, such as an optical fiber and a photodetector. Often, as necessitated by environmental and construction considerations, the optical waveguide must be placed far away from the photodetector. Since laser light that leave the optical waveguide will diverge, one or more lenses are placed between the waveguide and photodetector to collect the divergent light beam and focus it onto the photodetector. This optical path introduces multiple, high optical index contrast interfaces. At every boundary between different media, such as fiber/air, air/lens, lens/air, air/photodetector, reflection occurs due to the high index change. These reflections are lost energies that degrade the signal strength. Present techniques used to reduce the amount of signal loss include antireflection coating of individual components and the addition of a thick film of index matching media on the photodetector.

Furthermore, in some applications, such as analog signal transmission, multiple reflections can cause signal noise. Extra care is needed to prevent reflection from the receiver optical subassembly back into the optical fiber waveguide. For example, return loss in analog CATV transmission system requires that the receiver return loss to exceed 40 dB. Typically, the fiber is angle-cleaved at 6-8 degrees to achieve the required return loss.

Accordingly, a new apparatus and method are needed to reduce signal strength degradation.

SUMMARY

In order to reduce signal strength degradation, index contrast reduction media are inserted between a photodetector, coupling optics and/or waveguide. The media have refractive indices between the index of refraction of the photodetector and coupling optics, and between the index of refraction of the optical fiber and the coupling optics. In an embodiment, the media includes one or more of silicone, epoxy or other transparent media with refractive indices higher than air that will reduce or eliminate the unwanted light reflections in these devices.

In an embodiment, a coupling apparatus comprises a light source (e.g., a fiber), a port (e.g., a photodetector), a low contrast medium and a lens. The lens is disposed between the light source and the port such that light emitted by the light source is focused onto the port. The low contrast medium is disposed between the light source and lens and/or between the port and lens.

In an embodiment, a method of forming a coupling apparatus includes: aligning a lens between a light source (e.g., a fiber) and a port (e.g., a photodector) such that light emitted from the light source is focused by the lens onto the port; and applying a low contrast medium between the light source and lens and/or between the port and lens.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Figure 1:
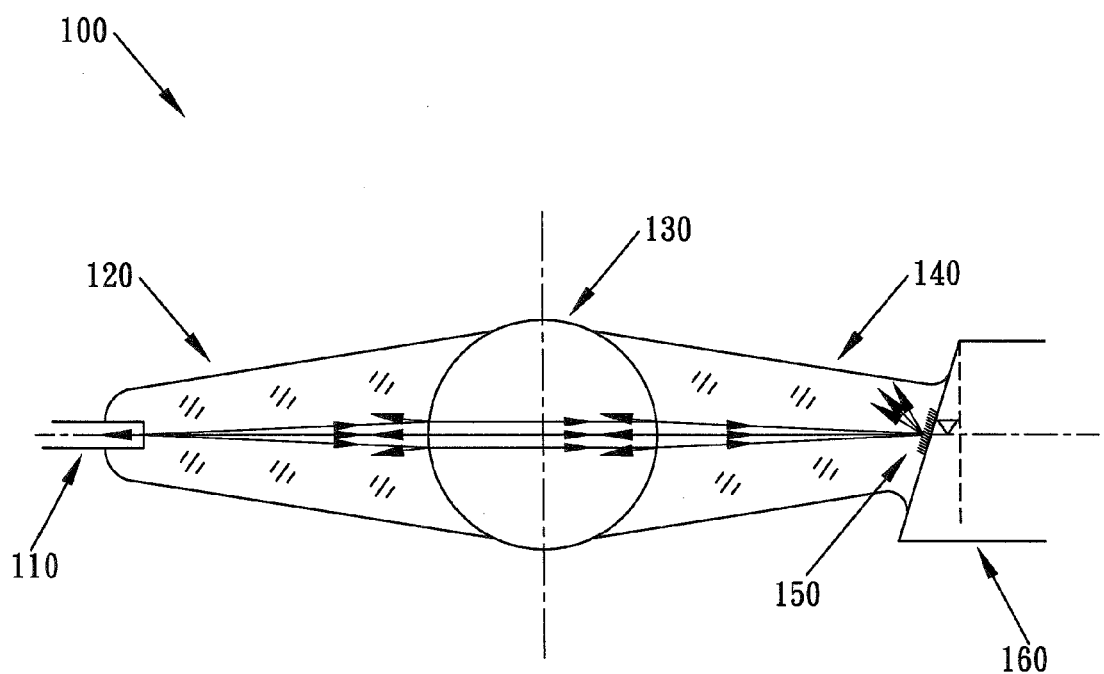
FIG. 1 is a diagram illustrating a coupling apparatus according to an embodiment of the invention.

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Embodiments of the invention address the multiple reflections due to high contrast index changes in the optical path of a coupling apparatus. Wherever possible, air or vacuum, which have low indices of refraction, is replaced by a higher index medium so that low contrast index changes are achieved for the optical path.

In an embodiment, as described further below, laser light from a light source, such as an optical fiber is focused by a single convex lens onto a port, such as a photodetector. Under existing techniques, antireflection thin films, coated on both sides of the lens, are used to reduce reflection at the interfaces. In an embodiment, index contrast reduction media is used to replace air wherever the optical beam traverses. The same four or more interfaces are still present, but the reflection at each of these interfaces is significantly reduced if media with the right refractive indices are chosen. Advantageous media include silicone, epoxy, or other transparent media, either solid or liquid, with an index higher than 1.0, but not so high that the index exceeds that of the convex lens.

By using a contrast reduction medium with an optical index close to that of the fiber, fiber/media reflection is minimized. Furthermore, divergence of the laser light after exiting from the fiber is reduced, so that a smaller lens can be used. The refractive index of the chosen lens will be higher than that of the medium so the diverging beam is collected into a converging beam pointing towards the detector. At the medium/detector interface, reflection is also significantly smaller than that of an air/detector interface. Reduced reflection at the multiple interfaces in the receiver is effective at reducing return loss. This could work with or without the 6-8 degree cleaved fiber to achieve reduced reflections.

Embodiments of the invention can also be applied in conjunction with anti-reflection films deposited on the lens, photodetector and/or the fiber. This will result in a further reduction in reflection losses.

It is also possible in the above embodiment to use a concave lens as the focusing optical element as long as the refractive index of the concave lens is lower than that of the inserted contrast reduction media.

In another embodiment, no index matching medium is used between the optical fiber and lens. This configuration results in a little more loss than the previous, but still substantially lower than the conventional arrangement.

FIG. 1 is a diagram illustrating a coupling apparatus 100 according to an embodiment of the invention. The coupling apparatus 100 includes a fiber 110, a transparency medium 120, a lens 130, a second transparency medium 140, a photodetector 150, and a photodetector mount base 160. The transparency medium 120 is disposed between the fiber 110 and the lens 130 such that light emitted from the fiber 110 travels through the medium 120 only to the lens 130, i.e., such that light emitted from the fiber 110 does not traverse air from the fiber 110 end to the lens 130. The medium 140 is disposed between the lens 130 and the photodetector 150, which is mounted on the mount base 160 at an angle (e.g., about 6° to about 8°), such that light from the lens 130 travels only through the medium 140 until impacting the photodetector 150, i.e., light from the lens 130 does not traverse air from the lens 130 to the photodetector 150.

In an embodiment the fiber 110 end has a 0° cut and a refractive index of $n_{fiber}$. The medium 120 has a refractive index of $n_{medium1}$, which is close to $n_{fiber}$ so as to minimize reflection as the boundary between the fiber 110 end and the medium 120. Reflectivity, R, at the interface between the fiber 110 and the medium 120 is:

$$R = \left( \frac{n_{fiber} - n_{medium1}}{n_{fiber} + n_{medium1}} \right)^2$$

The medium 140 has a refractive index of $n_{medium2}$, which is set close to the refractive index of the photodetector 150, which can be coated with single or multilayer dielectric anti-reflective coating. Further, the refractive index of the lens 130 can be close to the refractive index of the media 120 and 140. The lens 130 includes a convex lens in one embodiment. In an embodiment, the media 120 and 140 are made of different materials and therefore may have slightly varying refractive indices. The refractive indices of the materials are greater than 1.0 but do not exceed the index of the lens 130. Further, as the photodetector 150 is at an angle with respect to the light output from the fiber 110, reflections are away from incoming light, thereby preventing distortion of the incoming light. As such, reflections along the light path between the fiber 110 and photodetector 150 are minimized.

Figure 2:
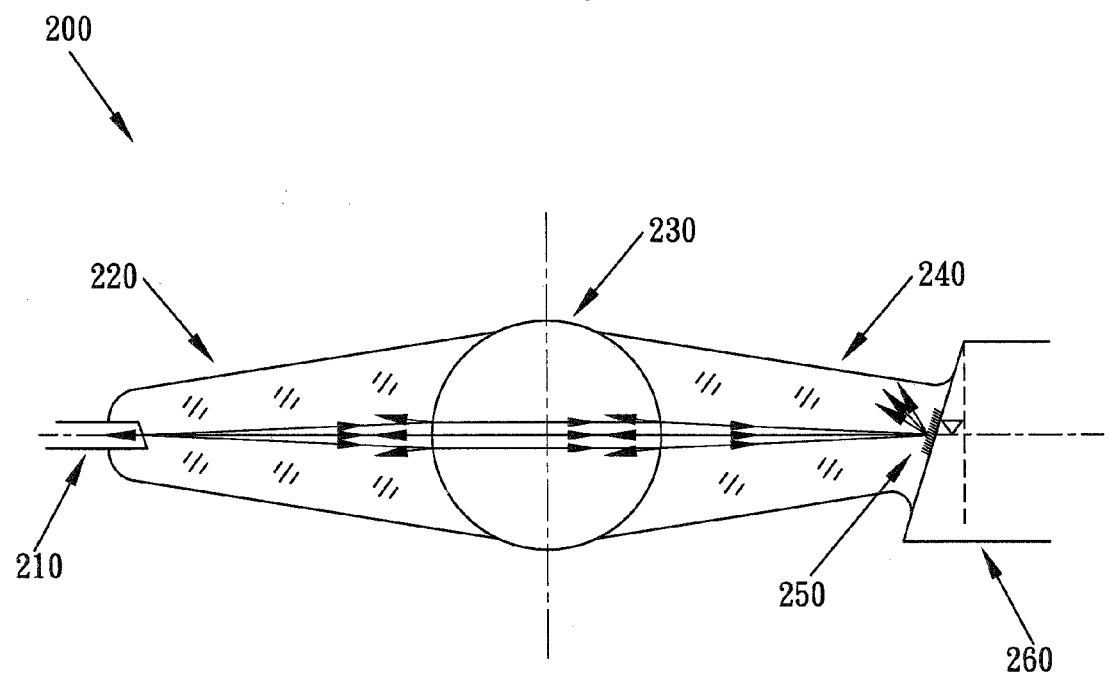
FIG. 2 is a diagram illustrating a coupling apparatus according to an embodiment of the invention.

FIG. 2 is a diagram illustrating a coupling apparatus 200 according to an embodiment of the invention. The apparatus 200 is substantially similar to the apparatus 100 except that a fiber 210 has an angled cut (e.g. about 8°) at its output. As such, for purposes of brevity, apparatus 200 will not be discussed in further detail.

Figure 3:
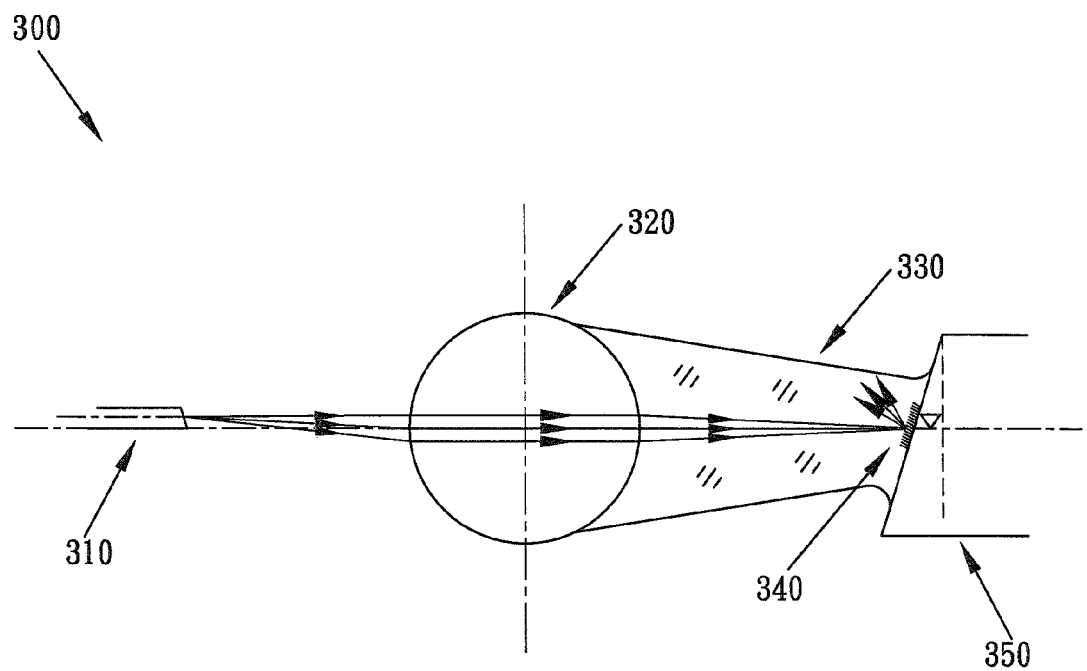
FIG. 3 is a diagram illustrating a coupling apparatus according to an embodiment of the invention.

FIG. 3 is a diagram illustrating a coupling apparatus 300 according to an embodiment of the invention. The coupling apparatus 300 includes a fiber 310, a lens 320, a transparency medium 330, a photodetector 340, and a photodetector mount base 350. The lens 320 is disposed between the fiber 310 and the photodetector 340. The medium 330 is disposed between the lens 320 and the photodetector 340, which is mounted on the mount base 350 at an angle (e.g., about 6° to about 8°), such that light from the lens 320 travels only through the medium 330 until impacting the photodetector 340, i.e., light from the lens 320 does not traverse air from the lens 320 to the photodetector 340.

In an embodiment the fiber 310 end has about a 0°-8° cut and a refractive index of $n_{fiber}$. The medium 330 has a refractive index of $n_{medium}$, which is set close to the refractive index of the photodetector 330, which can be coated with anti-reflective coating. Further, the refractive index of the lens 320 can be close to the refractive index of the medium 330. The lens 320 includes a convex lens in one embodiment. The refractive index of the material 330 is greater than 1.0 but does not exceed the index of the lens 320. Further, as the photodetector 340 is at an angle with respect to the light output from the fiber 310, reflections are away from incoming light, thereby preventing distortion of the incoming light. As such, reflections along the light path between the fiber 310 and photodetector 340 are minimized.

Figure 4:
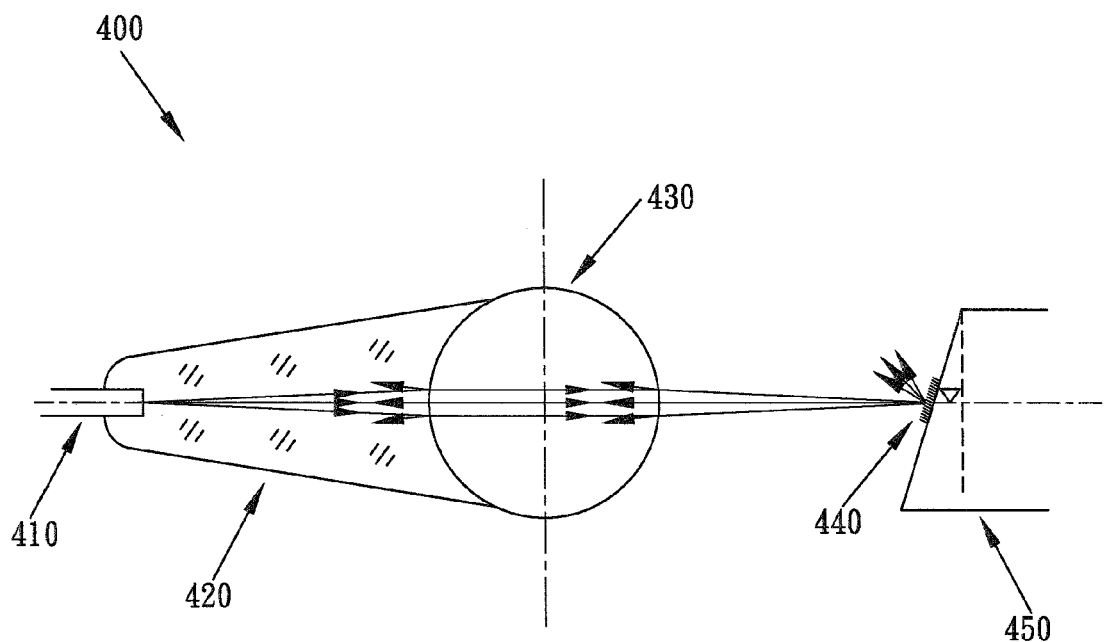
FIG. 4 is a diagram illustrating a coupling apparatus according to an embodiment of the invention.

FIG. 4 is a diagram illustrating a coupling apparatus 400 according to an embodiment of the invention. The coupling apparatus 400 includes a fiber 410, a transparency medium 420, a lens 430, a photodetector 440, and a photodetector mount base 450. The lens 430 is disposed between the fiber 410 and the photodetector 440, which is mounted on the mount base 450 at an angle (e.g., about 6° to about 8°). The medium 420 is disposed between the lens 430 and the fiber 410, such that light from the fiber 410 travels only through the medium 420 until impacting the lens 430, i.e., light from the fiber 410 does not traverse air from the fiber 410 to the lends 430.

In an embodiment the fiber 410 end has about a 0°-8° cut and a refractive index of $n_{fiber}$. The medium 420 has a refractive index of $n_{medium}$, which is set close to the refractive index of the fiber 410. Further, the refractive index of the lens 430 can be close to the refractive index of the medium 420. The lens 430 includes a convex lens in one embodiment. The refractive index of the medium 420 is greater than 1.0 but does not exceed the index of the lens 430. Further, as the photodetector 440 is at an angle with respect to the light output from the fiber 410, reflections are away from incoming light, thereby preventing distortion of the incoming light. As such, reflections along the light path between the fiber 410 and photodetector 440 are minimized.

Figure 5:
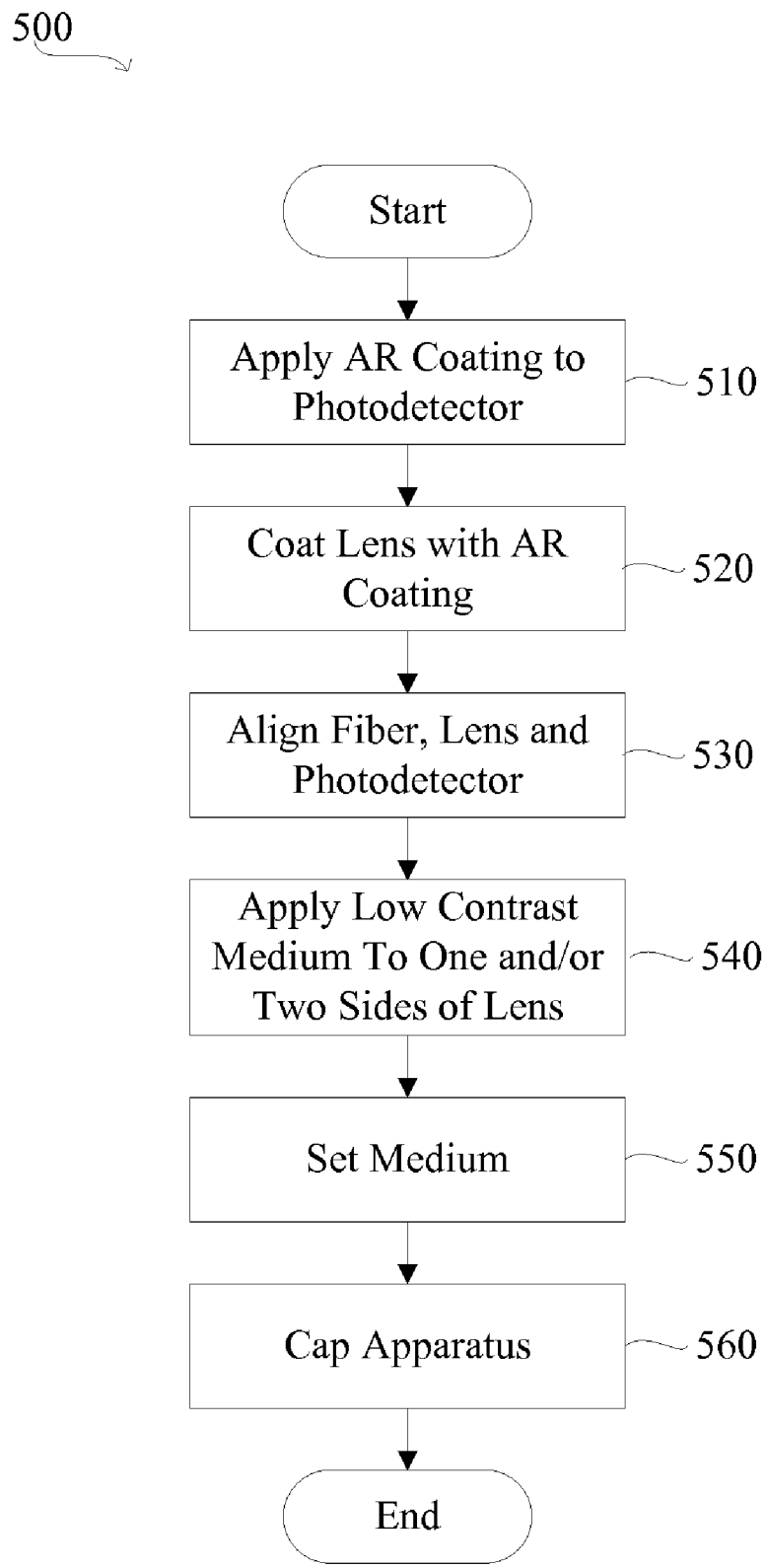
FIG. 5 is a flowchart illustrating a method of forming a coupling apparatus.

FIG. 5 is a flowchart illustrating a method 500 of forming a coupling apparatus. First, an anti-reflective coating is applied (510, 520) to a photodetector and a lens. A fiber, lens and photodetector are then aligned (530) so that light from the fiber impacts a lens, which focuses the light onto the photodetector. A low contrast medium is then applied (540) to the lens/fiber side and/or lens/photodetector side. The application (540) can be by spray coating or injection via syringe.

The applied medium is then set (550) by UV exposure or heat, if necessary. The apparatus is then capped (560). The method 500 then ends. In an embodiment, elements of the method can be omitted or performed in different order. For example, the applying (510, 520) can be omitted or performed after the aligning (530). The setting (550) can also be omitted.

The foregoing description of the illustrated embodiments of the present invention is by way of example only, and other variations and modifications of the above-described embodiments and methods are possible in light of the foregoing teaching. For example, while the embodiments are disclosed showing a fiber and photodetector, other embodiments can use any light source and/or port. The embodiments described herein are not intended to be exhaustive or limiting. The present invention is limited only by the following claims.

What is claimed is:

1. A coupling apparatus, comprising:
    a light source;
    a port;
    a lens disposed between the light source and the port such that light emitted by the light source is focused onto the port; and
    a contrast reduction medium comprising a transparent media encompassing an entire light path from the lens to the port such that light does not traverse any air along the light path.

2. The apparatus of claim 1, wherein the refractive index of the medium is less than the refractive index of the lens.

3. The apparatus of claim 1, wherein the refractive index of the light source is less than the refractive index of the lens.

4. The apparatus of claim 1, further comprising a mount and wherein the port is coupled to the mount at an angle with respect to the light emitted by the light source.

5. The apparatus of claim 1, wherein an end of the light source has an angled cut.

6. The apparatus of claim 1, wherein the lens is coated with an antireflective coating.

7. The apparatus of claim 1, wherein the port is coated with an antireflective coating.

8. The apparatus of claim 1, wherein the port includes a photodetector.

9. The apparatus of claim 1, wherein the light source includes a fiber.

10. A method of forming a coupling apparatus, comprising:
    aligning a lens between a light source and a port such that light emitted from the light source is focused by the lens onto the port; and
    applying a contrast reduction medium comprising a transparent media encompassing an entire light path from the lens to the port such that light does not traverse any air along the light path.

11. The method of claim 10, wherein the refractive index of the medium is less than the refractive index of the lens.

12. The method of claim 10, wherein the refractive index of the light source is less than the refractive index of the lens.

13. The method of claim 10, further comprising coupling the port to a mount at an angle with respect to light emitted from the light source.

14. The method of claim 10, wherein an end of the light source has an angled cut.

15. The method of claim 10, further comprising coating the lens with an antireflective coating.

16. The method of claim 10, further comprising coating the port with an antireflective coating.

17. The method of claim 10, further comprising setting the medium.

18. The method of claim 17, wherein the setting comprises applying heat to the medium.

19. The method of claim 17, wherein the setting comprises applying UV radiation to the medium.

20. The method of claim 10, further comprising capping the apparatus.

21. The method of claim 10, wherein the light source includes a fiber.

22. The method of claim 10, wherein the port includes a photodetector.

23. The apparatus of claim 1, wherein the contrast reduction medium includes a solid.

24. The apparatus of claim 1, wherein the contrast reduction medium includes a liquid.

25. The apparatus of claim 1, wherein the contrast reduction medium includes silicone.

26. The apparatus of claim 1, wherein the contrast reduction medium includes epoxy.

* * * * *